Patented May 4, 1926.

1,583,762

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

METHOD OF VULCANIZING CAOUTCHOUC AND PRODUCT PRODUCED THEREBY.

No Drawing. Original application filed February 9, 1924, Serial No. 691,854. Divided and this application filed December 23, 1925. Serial No. 77,411.

*To all whom it may concern:*

Be it known that I, LORIN B. SEBRELL, a citizen of the United States, and resident of Akron, Ohio, have invented new and useful Improvements in Methods of Vulcanizing Caoutchouc and Products Produced Thereby, of which the following is a specification.

My invention relates to methods of vulcanizing rubber and rubber compounds, and it has, for its primary object, the provision of methods of vulcanization which shall insure products of high quality, especially adapted for the construction of various rubber articles, and in particular, pneumatic tire casings.

It is well-known, of course, that accelerators are very desirable in producing vulcanized rubber possessing suitable characteristics to adapt it for the manufacture of many rubber articles, of which pneumatic tire casings form an outstanding example. The accelerators are employed, not only as catalysts, but also to obtain certain desired physical properties in vulcanized rubber compounds, which will enhance their value in many applications. For example, some accelerators are especially desirable because they impart such physical characteristics to the vulcanized compound that it ages exceptionally well, which is a desirable quality when it is employed in a great many capacities, particularly in rubber tires. Other accelerators impart other outstanding characteristics, which it is especially desired to secure. It will be apparent, then, that although there are a number of accelerators now known to the art, nevertheless each has its desirable features, and may be especially selected with a view to producing a final product which is particularly adapted for a certain use.

The present invention is primarily concerned with the disclosure of a number of accelerators of such character as to insure a vulcanized rubber product that is susceptible of general application.

It has been found, from extensive experimentation, that thiodiazoles are desirable accelerators for general application. The accelerators may be broadly designated as compounds of pentacyclic formation, containing two carbon atoms, two nitrogen atoms and one sulfur atom, with a mercapto group joined to one of the carbon atoms. Generic claims to this class of compounds are made in copending application No. 691,854, filed February 9, 1924, while the present case, which is a division thereof, is restricted in scope to certain species, as will appear from a perusal of the claims.

Certain of the compounds may be somewhat more specifically indicated by the following structural formula:

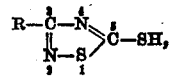

which is numbered in accordance with the more modern form of nomenclature. In the latter formula, if R is a phenyl group, the resulting compound is designated as 3-phenyl-5-mercapto-1-2-4-thiodiazole. As an example of how the latter compound may be embodied in a vulcanizing process, the following ingredients may be admixed in the proportions set forth.

| | Parts. |
|---|---|
| Rubber | 50 |
| Zinc oxide | 2.5 |
| Sulfur | 3 |
| 3-phenyl-5-mercapto-1-2-4-thiodiazole | .5 |

A rubber product, having a relatively high tensile strength and other desirable characteristics, resulted from subjecting the above mixture to a temperature corresponding to 40 pounds of steam pressure, for 30 minutes. Lower sulfur ratios may be utilized without appreciably lengthening the time of cure. Moreover, zinc oxide or litharge may be embodied in the compound in which the above accelerator is employed, either of which will serve as an activator for the accelerator, and consequently increase its power to hasten the vulcanizing process. Such activators are preferably mixed with the accelerator to form a physical combination therewith. Metallic salts may also be employed to advantage with the accelerator as activators therefor, such salts being mixed with the accelerator in the same manner as the metallic oxides. Examples of such metallic salts are

3. A method of vulcanizing caoutchouc that comprises admixing caoutchouc with a vulcanizing agent, incorporating in the mix a salt of 3-para-tolyl-5-mercapto-1-2-4-thiodiazole, adding an activator thereto, and subjecting the mixture to heat.

4. A method of vulcanizing caoutchouc that comprises admixing caoutchouc with a vulcanizing agent, incorporating in the mix a bivalent salt of 3-para-tolyl-5-mercapto-1-2-4-thiodiazole, adding an activator thereto, and subjecting the mixture to heat.

5. A method of vulcanizing caoutchouc that comprises admixing caoutchouc with a vulcanizing agent, incorporating in the mix the zinc salt of 3-para-tolyl-5-mercapto-1-2-4-thiodiazole, adding an activator thereto, and subjecting the mixture to heat.

6. A vulcanized caoutchouc product formed by the reaction of caoutchouc, a vulcanizing agent, an activator, and 3-para-tolyl-5-mercapto-1-2-4-thiodiazole.

7. A vulcanized caoutchouc product formed by the reaction of caoutchouc, a vulcanizing agent, an activator, and the zinc salt of a compound having the general formula:

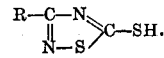

8. A vulcanized caoutchouc product formed by the reaction of caoutchouc, a vulcanizing agent, an activator, and the zinc salt of 3-para-tolyl-5-mercapto-1-2-4-thiodiazole.

In witness whereof, I have hereunto signed my name.

LORIN B. SEBRELL.